(12) United States Patent
Miller et al.

(10) Patent No.: US 10,145,316 B2
(45) Date of Patent: Dec. 4, 2018

(54) METHOD AND SYSTEM FOR ENGINE CONTROL

(71) Applicant: Ford Global Technologies, LLC, Dearborn, MI (US)

(72) Inventors: Kenneth James Miller, Canton, MI (US); Thomas G. Leone, Ypsilanti, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 15/146,822

(22) Filed: May 4, 2016

(65) Prior Publication Data
US 2017/0321615 A1 Nov. 9, 2017

(51) Int. Cl.
*F02D 15/02* (2006.01)
*B60W 10/06* (2006.01)
(Continued)

(52) U.S. Cl.
CPC ............ *F02D 15/02* (2013.01); *B60W 10/06* (2013.01); *B60W 10/101* (2013.01);
(Continued)

(58) Field of Classification Search
CPC ..... F02D 15/02; B60W 10/06; B60W 10/101; B60W 30/1882; B60W 2710/0644; B60W 2710/0666; B60W 2710/1005
See application file for complete search history.

(56) References Cited

U.S. PATENT DOCUMENTS

| 3,254,620 A | 6/1966 | Cannon |
| 3,640,894 A | 2/1972 | Sampson et al. |

(Continued)

FOREIGN PATENT DOCUMENTS

| CA | 2762747 A1 | 7/2012 |
| CN | 1223335 A | 7/1999 |

(Continued)

OTHER PUBLICATIONS

Hoffmann, W., et al., "A New Approach to Ethanol Utilization: High Efficiency and Low NOx in an Engine Operating on Simulated Reformed Ethanol," SAE Technical Paper 2008-01-2415, Powertrains, Fuels & Lubricants Meeting, Rosemont, IL, Oct. 6-9, 2008, 11 pages.

(Continued)

*Primary Examiner* — Stacey A Fluhart
(74) *Attorney, Agent, or Firm* — Julia Voutyras; McCoy Russell LLP

(57) ABSTRACT

Methods and systems are provided for integrating a VCR engine with a CVT transmission. Responsive to a driver demand, a controller may determine whether to maintain a current compression ratio or transition to an alternate compression ratio based on the fuel economy benefit of the transition and further based on any engine limitations that may be incurred at the engine speed-load following the transition. To improve the net fuel economy benefit while addressing the engine limitation, a compression ratio transition may be combined with a CVT adjusted engine speed-load regime, while maintaining engine power output.

9 Claims, 6 Drawing Sheets

(51) Int. Cl.
  *B60W 10/101*   (2012.01)
  *B60W 30/188*   (2012.01)
  *F02D 41/26*    (2006.01)
  *F02D 41/14*    (2006.01)

(52) U.S. Cl.
  CPC ..... *B60W 30/1882* (2013.01); *F02D 41/1406* (2013.01); *F02D 41/26* (2013.01); *B60W 2710/0644* (2013.01); *B60W 2710/0666* (2013.01); *B60W 2710/1005* (2013.01); *F02D 2041/1412* (2013.01); *F02D 2041/1433* (2013.01); *F02D 2200/101* (2013.01)

(56) References Cited

U.S. PATENT DOCUMENTS

| | | |
|---|---|---|
| 4,391,716 A | 7/1983 | McCurry |
| 4,505,169 A | 3/1985 | Ganoung |
| 5,237,978 A | 8/1993 | Bailey |
| 5,408,874 A | 4/1995 | Fleck, Sr. et al. |
| 5,785,136 A | 7/1998 | Falkenmayer et al. |
| 5,806,617 A * | 9/1998 | Yamaguchi ............ B60K 6/365 |
| | | 180/65.235 |
| 6,116,363 A | 9/2000 | Frank |
| 6,276,473 B1 | 8/2001 | Zur Megede |
| 6,378,637 B1 | 4/2002 | Ono et al. |
| 6,450,193 B1 | 9/2002 | Constantinou |
| 6,655,324 B2 | 12/2003 | Cohn et al. |
| 6,715,452 B1 | 4/2004 | Taylor, III et al. |
| 6,715,453 B2 | 4/2004 | Tomatsuri et al. |
| 6,796,287 B2 * | 9/2004 | Mogi ..................... B60K 6/445 |
| | | 123/319 |
| 6,915,766 B2 | 7/2005 | Aoyama et al. |
| 6,929,582 B2 | 8/2005 | Yang et al. |
| 6,970,781 B1 | 11/2005 | Chen et al. |
| 7,213,397 B2 | 5/2007 | Hu et al. |
| 7,258,099 B2 | 8/2007 | Yoshida et al. |
| 7,267,087 B2 | 9/2007 | Glugla |
| 7,295,902 B2 | 11/2007 | Chen et al. |
| 7,426,907 B2 | 9/2008 | Dearth et al. |
| 7,703,435 B2 | 4/2010 | Sumilla et al. |
| 7,676,321 B2 | 5/2010 | Andri |
| 7,748,481 B2 | 7/2010 | Holmes et al. |
| 7,805,238 B2 | 9/2010 | Andri |
| 7,826,957 B2 | 11/2010 | Fabien |
| 7,832,511 B2 | 11/2010 | Syed et al. |
| 7,845,315 B2 | 12/2010 | Leone et al. |
| 7,925,418 B2 | 4/2011 | Fabien |
| 8,015,951 B2 | 9/2011 | Dearth et al. |
| 8,050,831 B2 | 11/2011 | Martin et al. |
| 8,065,979 B2 | 11/2011 | Leone et al. |
| 8,118,009 B2 | 2/2012 | Pursifull et al. |
| 8,127,745 B2 | 3/2012 | Sumilla et al. |
| 8,141,356 B2 | 3/2012 | Leone et al. |
| 8,312,867 B2 | 11/2012 | Pursifull et al. |
| 8,375,899 B2 | 2/2013 | Leone et al. |
| 8,387,591 B2 | 3/2013 | Sumilla et al. |
| 8,539,914 B2 | 9/2013 | Kerns et al. |
| 8,550,058 B2 | 10/2013 | Pursifull et al. |
| 8,606,474 B2 | 12/2013 | Guo et al. |
| 8,656,869 B2 | 2/2014 | Leone et al. |
| 8,701,630 B2 | 4/2014 | Sumilla et al. |
| 8,738,255 B2 | 5/2014 | Carter et al. |
| 8,746,189 B2 | 6/2014 | Kawasaki |
| 9,038,613 B2 | 5/2015 | Pursifull et al. |
| 9,157,385 B2 | 10/2015 | Gallagher et al. |
| 9,376,967 B2 | 6/2016 | Springer et al. |
| 2004/0188154 A1 | 9/2004 | Carlson |
| 2007/0209619 A1 * | 9/2007 | Leone ................. B60W 10/06 |
| | | 123/90.12 |
| 2010/0063658 A1 | 3/2010 | Martin et al. |
| 2011/0005497 A1 * | 1/2011 | Irisawa ............... F02D 13/0226 |
| | | 123/48 R |
| 2011/0029177 A1 | 2/2011 | Yeung et al. |
| 2011/0246010 A1 | 10/2011 | de la Torre Bueno |
| 2011/0307159 A1 * | 12/2011 | Nakasaka ........... F02D 13/0215 |
| | | 701/102 |
| 2013/0055990 A1 | 3/2013 | Kamada |
| 2014/0067540 A1 | 3/2014 | Williams et al. |
| 2014/0116395 A1 | 5/2014 | Blackstock |
| 2014/0202430 A1 | 7/2014 | Monros |
| 2015/0114359 A1 | 4/2015 | Leone et al. |
| 2015/0300830 A1 | 10/2015 | Fisher |
| 2016/0341118 A1 * | 11/2016 | Kamo .................. F02B 75/045 |

FOREIGN PATENT DOCUMENTS

| | | |
|---|---|---|
| CN | 103291468 A | 9/2013 |
| CN | 104005861 A | 8/2014 |
| CN | 203756344 U | 8/2014 |
| JP | 407019124 A | 1/1995 |
| JP | 2006257907 A | 9/2006 |
| JP | 2007077918 A | 3/2007 |
| SU | 0731020 | 4/1980 |
| SU | 0848725 | 7/1981 |
| WO | 2007027327 A2 | 3/2007 |

OTHER PUBLICATIONS

Kadota, M. et al., "Advanced Control System of Variable Compression Ratio (VCR) Engine with Dual Piston Mechanism," SAE International 2009-01-1063, Apr. 20, 2009, 10 pages.

Wheeler, Jennifer C. et al., "High Efficiency, Low Feedgas NOx, and Improved Cold Start Enabled by Low Temperature Ethanol Reforming," SAE International 2010-01-0621, Apr. 12, 2010, 18 pages.

Wheeler, Jennifer C. et al., "Low-Temperature Ethanol Reforming: A Multi-Cylinder Engine Demonstration," SAE International 2011-01-0142, Apr. 12, 2011, 20 pages.

Kleeberg, Henning et al., "Increasing Efficiency in Gasoline Powertrains with a Two-Stage Variable Compression Ratio (VCR) System," SAE International 2013-01-0288, Apr. 8, 2013, 10 pages.

Morgenstern, David et al., "Integration of an E85 Reforming System into a Vehicle-Ready Package and Project Results," SAE International 2014-01-1191, Apr. 1, 2014, 12 pages.

Ferrey, Paul et al., "Potential of a Variable Compression Ratio Gasoline SI Engine with Very High Expansion Ratio and Variable Valve Actuation," SAE International 2014-01-1201, Apr. 1, 2014, 20 pages.

Glugla, Chris Paul, "Method and System for Pre-Ignition Control," U.S. Appl. No. 14/604,279, filed Jan. 23, 2015, 54 pages.

Glugla, Chris Paul, "Method and System for Engine Control," U.S. Appl. No. 14/923,900, filed Oct. 27, 2015, 41 pages.

Miller, Kenneth James et al., "Method and System for Engine Control," U.S. Appl. No. 15/146,687, filed: May 4, 2016, 54 pages.

Leone, Thomas G. et al., "Method and System for Engine Control," U.S. Appl. No. 15/146,720, filed May 4, 2016, 62 pages.

Leone, Thomas G. et al., "Method and System for Hybrid Vehicle Control," U.S. Appl. No. 15/146,752, filed May 4, 2016, 46 pages.

Miller, Kenneth James et al., "Method and System for Engine Control," U.S. Appl. No. 15/146,784, filed May 4, 2016, 47 pages.

Miller, Kenneth James et al., "Method and System for Engine Control," U.S. Appl. No. 15/146,809, filed May 4, 2016, 52 pages.

* cited by examiner

METHOD AND SYSTEM FOR ENGINE CONTROL

FIELD

The present description relates generally to methods and systems for controlling an engine compression ratio in a hybrid electric vehicle system.

BACKGROUND/SUMMARY

The compression ratio of an internal combustion engine is defined as the ratio of the cylinder volume when the piston is at bottom-dead-center (BDC) to the cylinder volume when the piston is at top-dead-center (TDC). In general, the higher the compression ratio, the higher the thermal efficiency of the internal combustion engine. This in turn results in improved fuel economy and a higher ratio of output energy versus input energy of the engine. In conventional engines, the compression ratio is fixed and thus the engine efficiency cannot be optimized during operating conditions to improve fuel economy and engine power performance.

Various technologies have been developed to enable the compression ratio of an engine to be varied with engine operating conditions. One example approach is shown by Yoshida et al. in U.S. Pat. No. 7,258,099. Therein, cam timing adjustments are used to vary the effective compression ratio. For example, a late intake valve closing is used to reduce the effective compression ratio. Still other approaches, such as shown by Kamada et al. in US20130055990, rely on a piston displacement changing mechanism that moves the pistons closer to or further from the cylinder head, thereby changing the size of the combustion chambers.

However the inventors herein have recognized potential issues with such approaches. As one example, the optimal fuel economy gain associated with adjusting a compression ratio may not be realized due to the fixed gear ratio of the transmission. In particular, at a given driver demand, for each compression ratio of the engine, there may be an associated fixed engine speed and load range that meets the driver demand. An engine controller may transition to a more fuel efficient compression ratio for the driver demand. However, upon changing compression ratios, there may be engine limitations experienced at the associated engine speed-load that may reduce the fuel economy benefit of the compression ratio transition. As an example, upon transitioning to a higher compression ratio, the engine may become more knock-limited at high loads. The fuel penalty associated with the knock mitigation may outweigh the fuel economy benefit of the compression ratio transition. As another example, upon transitioning to a lower compression ratio, the engine may become more friction limited at low loads. Another issue is that frequent changes in operator pedal demand may cause the engine load to move back and forth, leading to frequent switching between compression ratios. Excessive compression ratio switches can degrade fuel economy due to losses incurred during transitions.

The inventors herein have recognized that the fuel economy benefits of a variable compression ratio (VCR) engine may be better leveraged through integration with a continuously variable transmission (CVT). In particular, the CVT may enable the engine speed and load to be adjusted while maintaining the fuel efficient compression ratio and while maintaining the power output of the engine. In one example, fuel economy may be improved by a method for an engine coupled to a CVT comprising, for a desired power level, comparing engine efficiency at a current compression ratio to engine efficiency at a modified compression ratio with an adjusted engine speed-load; and in response to a higher than threshold improvement in the engine efficiency at the modified compression ratio with the adjusted engine speed-load, transitioning to the modified compression ratio and adjusting to the adjusted engine speed-load. In this way, an engine can be operated with a compression ratio that provides an improved fuel economy for a given driver demand without being excessively knock limited at higher loads. In addition, the need for frequent compression ratio switching can be reduced.

As an example, an engine system may be configured with a VCR engine coupled to vehicle wheels via a CVT transmission. The VCR engine may be configured with a piston position changing mechanism that enables the compression ratio (CR) to be varied between at least a lower value and a higher value. For a given driver demanded power level, an engine controller may compare the fuel efficiency for each of the higher CR and the lower CR. Then, for the more fuel efficient compression ratio, the controller may predict if there are any limitations, such as knock limitations, associated with the corresponding engine speed-load. If so, the controller may further determine if the engine speed-load can be changed while maintaining the selected CR and while maintaining the demanded engine power output, and any fuel penalties associated therewith. If the engine speed-load can be changed after transitioning the CR with a net fuel economy improvement, the controller may proceed with the CR transition. Else, the original CR may be maintained. As an example, upon transitioning to a higher compression ratio, for a given driver demand, the engine speed may increase while the engine load decreases. To address knock anticipated at the higher compression ratio, an engine controller may actuate the CVT to increase the engine speed while decreasing the engine load so as to maintain the demanded engine power output while providing a net fuel benefit. Likewise, when transitioning to a lower compression ratio, the engine speed may be lowered (from the previous engine speed for the higher CR) while load is increased (as compared to the previous load for the higher CR).

In this way, fuel economy benefits can be improved. The technical effect of integrating VCR engine technology in a vehicle having a CVT transmission is that for a given driver demanded power, the benefits of a variable compression ratio can be better leveraged. In particular, the engine speed and torque for a given driver demanded power can be adjusted to reduce knock limitations at higher loads and friction losses at lower loads, while accounting for changes in compression ratio. The technical effect of assessing the fuel economy benefit of changing the compression ratio with the fuel penalty associated with operating at the engine speed-load profile corresponding to the selected compression ratio is that frequent CR switching can be reduced. In addition, engine operation in a more fuel efficient compression ratio can be extended despite changes in driver or wheel power demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
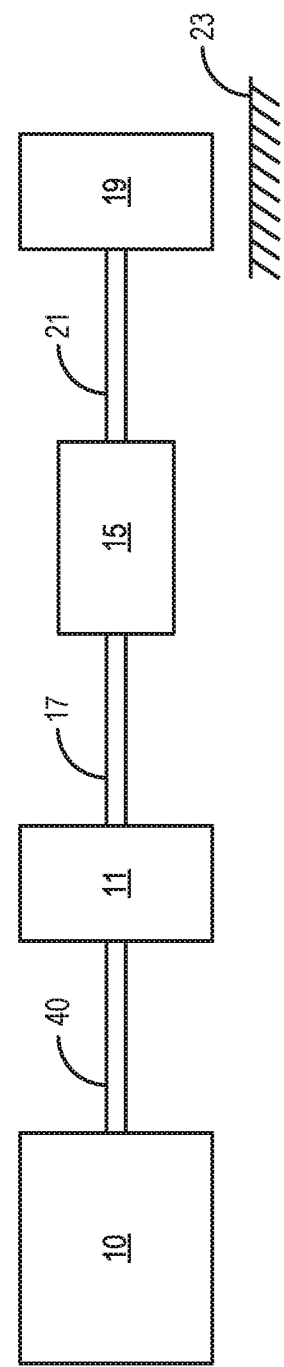
FIG. 1 illustrates an example vehicle powertrain.
Figure 4:
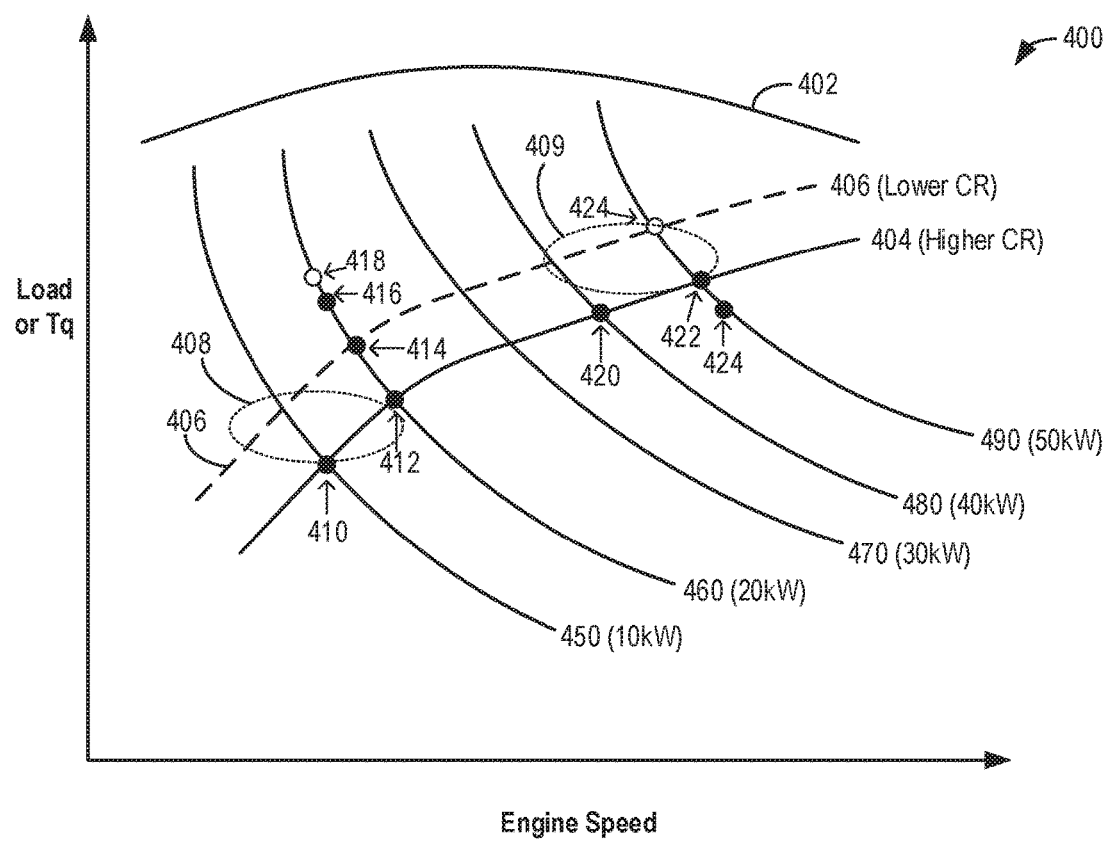
FIG. 4 shows an example map for selecting compression ratio usage.
Figure 5:
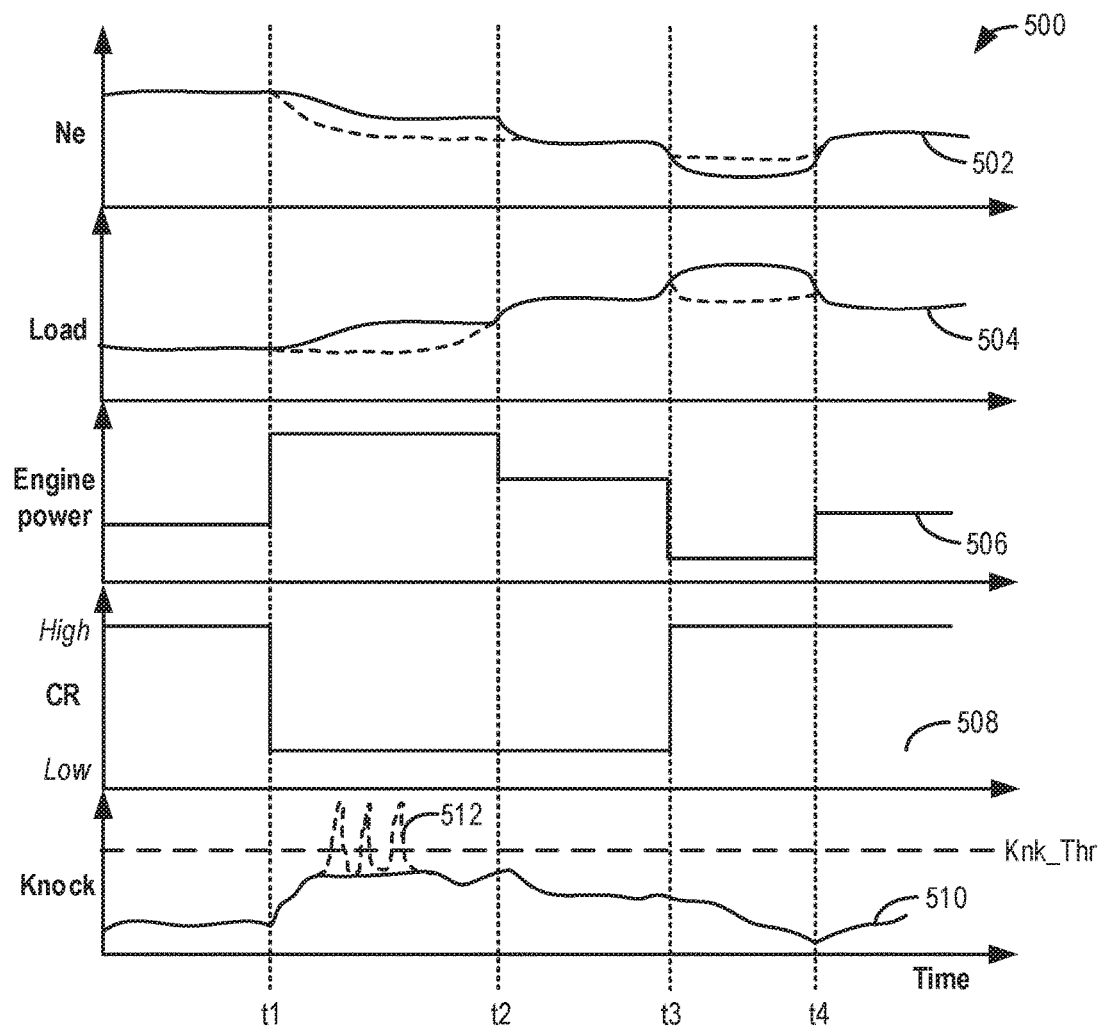
FIG. 5 shows example VCR and CVT adjustments during engine operation.

The following description relates to systems and methods for improving fuel economy in a vehicle having a continuously variable transmission (herein also referred to as a CVT), such as the powertrain of FIG. 1. The powertrain may include an engine configured with a piston whose position within a combustion chamber can be varied, as described with reference to the engine system of FIG. 2. A controller may be configured to perform a control routine, such as the example routine of FIG. 3, to select a compression ratio while adjusting an engine speed-load profile at the selected CR via adjustments to a speed ratio of the CVT to better leverage the fuel economy benefits of the VCR engine. The controller may compare fuel island data maps for each compression ratio, such as the maps of FIG. 6. An example map that may be used by the controller to select whether to maintain or transition compression ratios is shown with reference to FIG. 4. An example engine operation with CR and CVT adjustments is shown at FIG. 5. In this way, VCT technology can be integrated and synergized with CVT technology to achieve significant fuel economy improvements.

Figure 2:
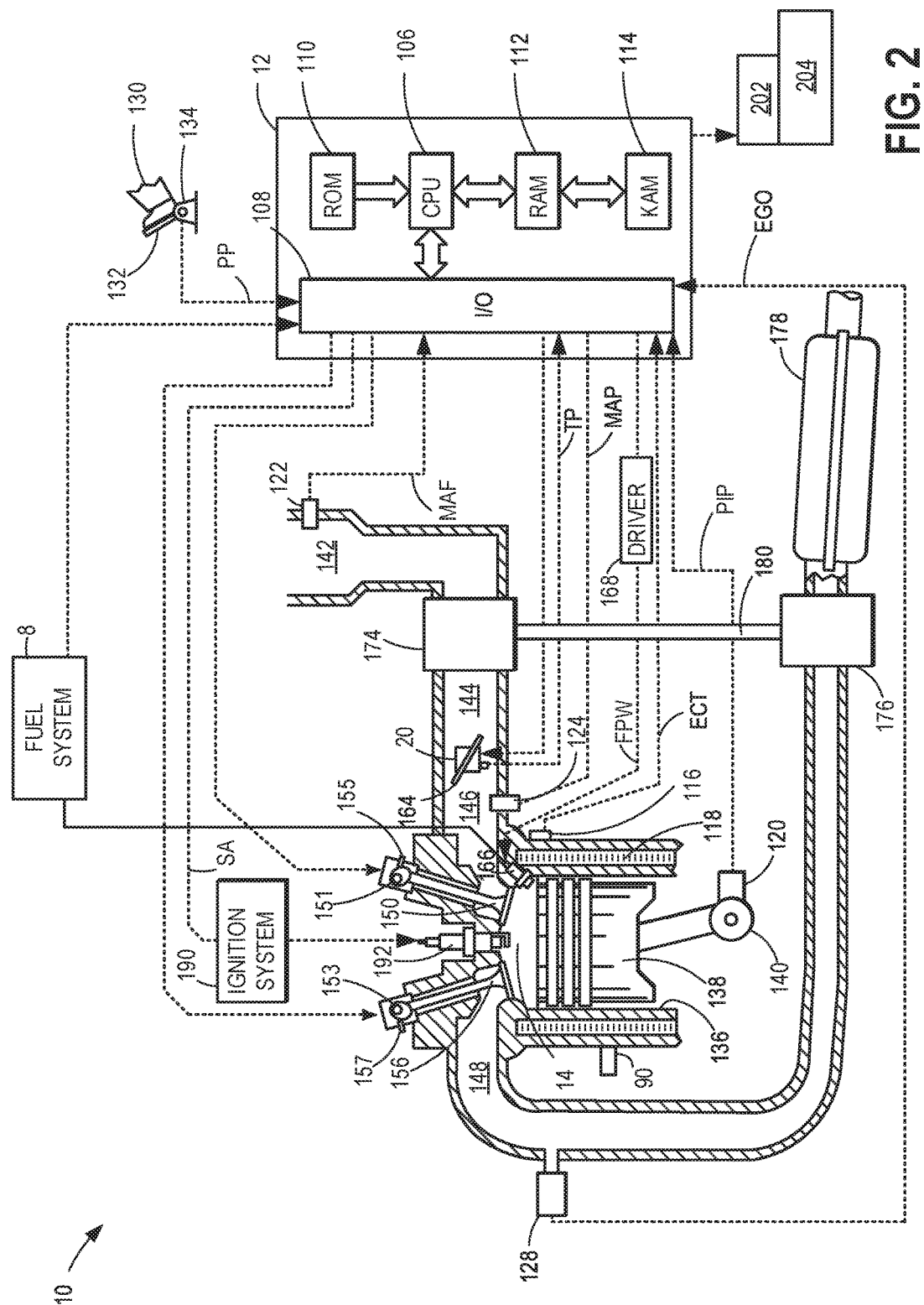
FIG. 2 shows a partial engine view.

Referring to FIG. 1, internal combustion engine 10, further described herein with particular reference to FIG. 2, is shown coupled to torque converter 11 via crankshaft 40. Torque converter 11 is also coupled to transmission 15 via turbine shaft 17. In one embodiment, transmission 15 comprises an electronically controlled transmission with a plurality of selectable speed ratios. Transmission 15 may also comprises various other gears, such as, for example, a final drive ratio (not shown). In the depicted example, transmission 15 is a continuously variable transmission (CVT). The CVT may be an automatic transmission that can change seamlessly through a continuous range of effective speed ratios, in contrast with other mechanical transmissions that offer a finite number of fixed gear ratios (speed ratios). The speed ratio flexibility of the CVT allows the input shaft to maintain a more optimized angular velocity. As elaborated with reference to FIGS. 3-4, by adjusting a speed ratio of the CVT, an engine controller may be configured to vary an engine speed-load profile while maintaining a demanded power output of the engine. For example, an engine speed may be lowered while an engine load is correspondingly increased to maintain a power output by adjusting the CVT to a lower speed ratio. As another example, an engine speed may be raised while an engine load is correspondingly decreased to maintain a power output by adjusting the CVT to a higher speed ratio. This enables fuel economy benefits of operating an engine in a selected compression ratio to be better leveraged.

Torque converter 11 has a bypass clutch (not shown) which can be engaged, disengaged, or partially engaged. When the clutch is either disengaged or being disengaged, the torque converter is said to be in an unlocked state. Turbine shaft 17 is also known as a transmission input shaft.

Transmission 15 may further be coupled to tire 19 via axle 21. Tire 19 interfaces the vehicle (not shown) to the road 23. Note that in one example embodiment, this power-train is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

FIG. 2 depicts an example embodiment of a combustion chamber or cylinder of internal combustion engine 10, such as engine 10 of FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Engine 10 may be configured as a variable compression ratio (VCR) engine wherein the compression ratio (CR) of each cylinder (that is, the ratio of the cylinder volume when the piston is at bottom-dead-center (BDC) to the cylinder volume when the piston is at top-dead-center (TDC)) can be mechanically altered. The CR of the engine may be varied via a VCR actuator 202 actuating a VCR mechanism 204. In some example embodiments, the CR may be varied between a first, lower CR (wherein the ratio of cylinder volume when the piston is at BDC to the cylinder volume when the piston is at TDC is smaller) and a second, higher CR (wherein the ratio is higher). In still other example, embodiments, there may be predefined number of stepped compression ratios. Further still, the CR may be continuously variable between the first, lower CR and the second, higher CR (to any CR in between).

In one example, VCR mechanism 204 is coupled to piston 138. Therein, the CR of the engine may be varied via a VCR mechanism that changes a piston TDC position. For example, piston 138 may be coupled to crankshaft 140 via a piston position changing VCR mechanism that moves the pistons closer to or further from the cylinder head, thus changing the size of combustion chamber 14. In one example, changing the position of the piston within the combustion chamber also changes the relative displacement of the piston within the cylinder. The piston position changing VCR mechanism may be coupled to a conventional cranktrain or an unconventional cranktrain. Non-limiting example of an unconventional cranktrain to which the VCR mechanism may be coupled include variable distance head crankshafts and variable kinematic length crankshafts. In one example, crankshaft 140 may be configured as an eccentric shaft. In another example, an eccentric may be coupled to, or in the area of a piston pin, the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). It will be appreciated that as used herein, the VCR engine may be configured to adjust the CR of the engine via mechanical adjustments that vary a piston position or a cylinder head volume. As such, VCR mechanisms do not include CR adjustments achieved via adjustments to a valve or cam timing.

By adjusting the position of the piston within the cylinder, an effective (static) compression ratio of the engine (that is a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to actuate the VCR mechanism to a first position where the piston has a smaller effective displacement within the combustion chamber. As another example, the engine may be operated at a second, higher compression ratio by the controller sending a signal to actuate the VCR mechanism to a second position where the piston has a larger effective displacement within the combustion chamber. As elaborated herein, changes in the engine compression ratio may be advantageously used to improve fuel economy. In addition, by coordinating CVT adjustments with CR adjustments (FIG. 3), the engine may be operated with a modified engine speed-load profile in the selected CR, so that synergistic improvements in fuel economy are attained. The modified engine speed-load profile may be modified from a default speed-load profile of the selected CR to account for engine limitations at the default speed-load profile, such as knock limitations or frictional losses. As such, the CVT adjustment enables the engine speed-load profile to be modified such that the engine power level at the selected CR in the modified speed-load profile is the same as the power level in the default speed-load profile (FIG. 4). As used herein, the power level corresponds to a powertrain output of the engine which is determined as a product of engine load and engine speed.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor of the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be varied based on driver demand via adjustments to a VCR actuator 202 that actuates a VCR mechanism 204, varying the effective position of piston 138 within combustion chamber 14.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. Further, the abnormal combustion may be accordingly addressed. For example, knock may be addressed by reducing the compression ratio and/or retarding spark timing while pre-ignition is addressed by enriching the engine or limiting an engine load.

Returning to FIG. 2, controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1-2 and employs the various actuators of FIGS. 1-2 to adjust engine operation based on the received signals and instructions stored on a memory of the controller. For example, adjusting the compression ratio of the engine may include the controller sending a signal to the VCR actuator which actuates the VCR mechanism to mechanically move the piston closer to or further from the cylinder head, to thereby change a volume of the combustion chamber. As another example, based on signals from the controller, a speed ratio of the transmission of FIG. 1 may be varied to alter an engine speed-load profile at a given power output.

Non-transitory storage medium read-only memory 110 can be programmed with computer readable data representing instructions executable by processor 106 for performing the methods described below as well as other variants that are anticipated but not specifically listed.

In this way the systems of FIGS. 1-2 provides for a vehicle system comprising: an engine with a cylinder; a VCR mechanism coupled to a piston of the cylinder for varying a compression ratio of the engine via mechanical alteration of a piston position within the cylinder; a continuously variable transmission (CVT) coupling the engine to vehicle wheels, the CVT having a plurality of speed ratios; and a controller. The controller may be configured with computer readable instructions stored on non-transitory memory for: estimating a first fuel economy associated with maintaining a first compression ratio to a second fuel economy associated with transitioning to a second compression ratio; if the second fuel economy is higher, predicting a fuel penalty associated with operating with a modified engine speed-load profile at the second compression ratio; and if the fuel penalty adjusted second fuel economy is higher than the first fuel economy, actuating the VCR mechanism to transition to the second compression ratio while selecting one of the plurality of speed ratios to provide the modified engine speed-load profile. Additionally or optionally, the controller may include further instructions for: if the first fuel economy is higher than the fuel penalty adjusted second fuel economy, maintaining a position of the VCR mechanism to maintain engine operation in the first compression ratio. Additionally or optionally, the modified engine speed-load profile at the second compression ratio may be a first modified engine speed-load profile based on an engine knock limit in the second compression ratio, wherein the controller includes further instructions for: while maintaining engine operation in the first compression ratio, predicting the fuel penalty associated with operating with a second modified engine speed-load profile at the first compression ratio, the second modified engine speed-load profile based on an engine friction loss in the first compression ratio; if the fuel penalty is smaller, operating with the second modified engine speed-load profile at the first compression ratio; and if the fuel penalty is larger, maintaining a default engine speed-load profile at the first compression ratio. Additionally or optionally, the selecting may include selecting a first lower speed ratio when the modified engine speed-load profile includes a higher engine speed and a lower engine load, and selecting a second higher ratio when the modified engine speed-load profile includes a lower engine speed and a higher engine load.

Figure 3:
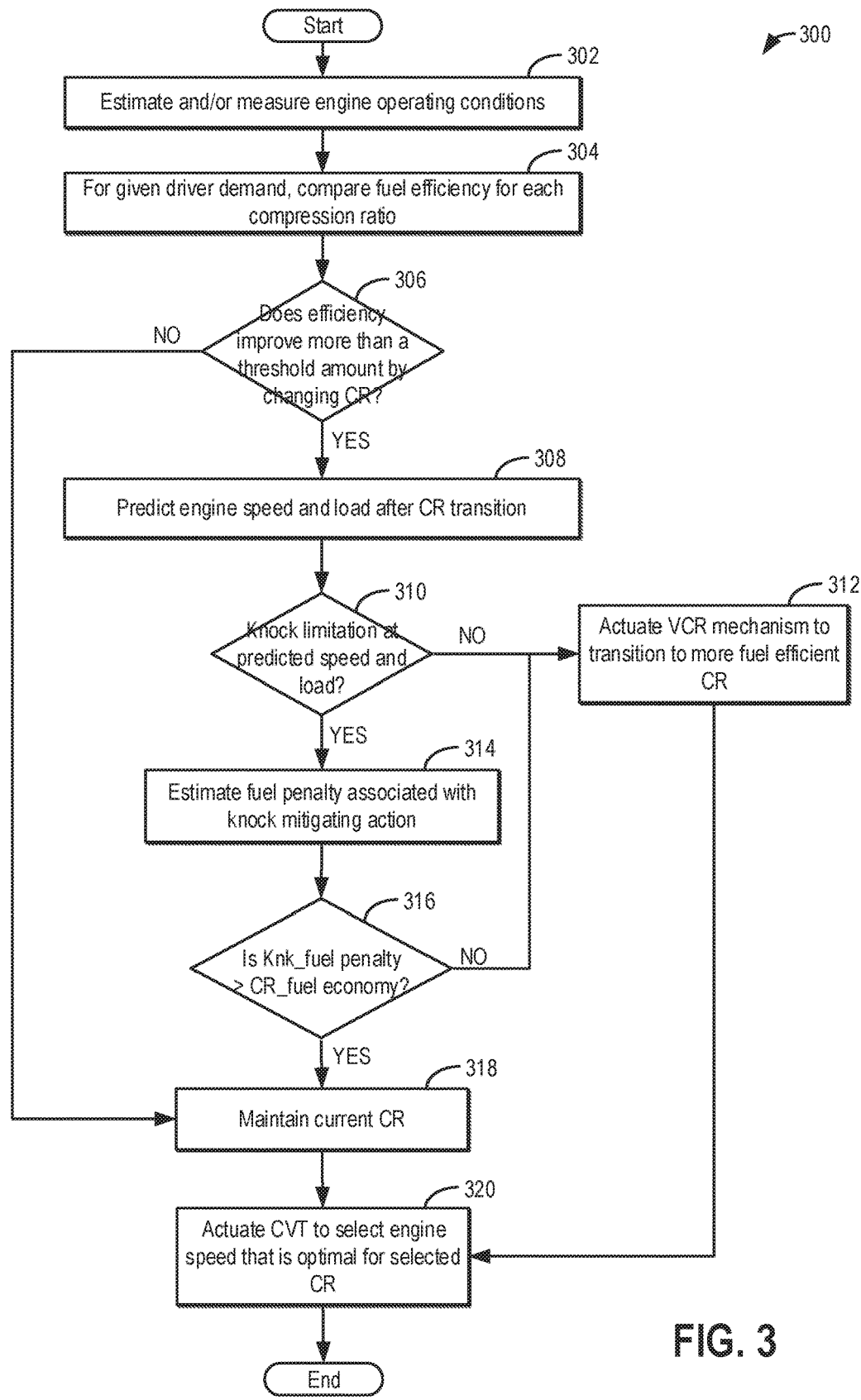
FIG. 3 shows a high level flow chart for selecting an engine compression ratio in a VCR engine and adjusting an engine speed-load profile in the selected CR with a continuously variable transmission.

Now turning to FIG. 3, an example routine 300 is described for coordinating adjustments to a compression ratio of an engine configured with a VCR mechanism with adjustments to a speed ratio of a continuously variable transmission (CVT). In this way, a powertrain profile of the engine (including engine speed and load) can be adjusted while maintaining a demanded power output of the engine and while synergizing fuel economy benefits from each of the VCR adjustment and the CVT adjustment. The method enables improvements in fuel economy despite frequent changes in driver power demand. Instructions for carrying out method 300 as well the other methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring engine operating conditions. These may include, for example, driver power demand (such as based on output of a pedal position sensor coupled to an operator pedal), ambient temperature, pressure and humidity, engine temperature, fuel level in a fuel tank, fuel octane of available fuel(s), manifold pressure (MAP), manifold air flow (MAF), catalyst temperature, intake temperature, boost level, etc.

At 304, the method includes, for the given driver power demand, comparing the fuel efficiency at each compression ratio of the engine. In one example, the engine is configured with a VCR mechanism that mechanically alters the engine compression ratio between a first, lower and a second, higher CR. In alternate examples, still more compression ratios may be possible. In one example, the controller may compare the fuel efficiency at the two compression ratios by comparing the brake specific fuel consumption (BSFC) of the engine at each compression ratio. The BSFC of the engine at each compression ratio may be stored in tables, maps, and/or equations as a function of operating conditions such as RPM, torque, temperature, humidity, inferred fuel octane, etc.

Figure 6:
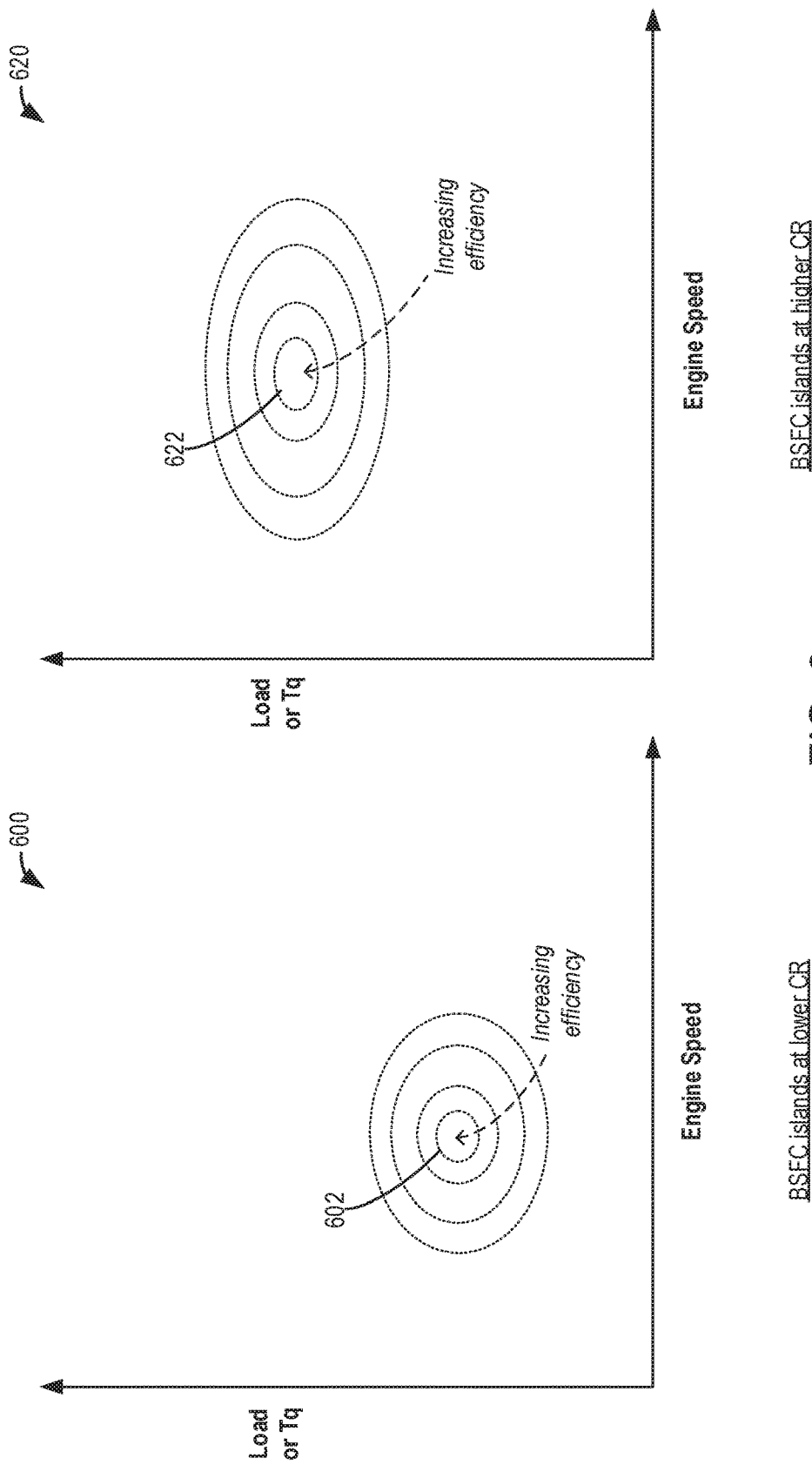
FIG. 6 shows example BSFC maps for an engine at two different compression ratios.

In one example, the engine may be calibrated at each compression ratio to map out islands of constant BSFC. FIG. 6 depicts example BSFC maps with BSFC islands for an engine at different compression ratios. In particular, map 600 depicts BSFC islands at a first, lower compression ratio (e.g., 10.0) and map 620 depicts BSFC islands at a second, higher compression ratio (e.g., 11.9). The maps depict engine speed (in RPM) along the x-axis and engine load or torque or BMEP (in bar) along the y-axis. BSFC islands are then plotted based on engine speed relative to load (in g/kW-hr). As such, engine efficiency may be determined as the inverse of BSFC. Thus for any set of BSFC islands, the innermost island with the smallest area (island 602 and 622 for maps 600 and 620, respectively) represents an engine operating region with the highest efficiency, and therefore the lowest fuel consumption. In addition, BSFC for the engine remains constant over a given island.

As can be seen, relative to islands 602, 622, engine efficiency drops as engine speed decreases. This is due to hot gases in the cylinder losing heat to cylinder walls, the losses being more pronounced at lower engine speeds. Engine efficiency also drops as engine speed increases relative to islands 602, 622. This is due to increased frictional losses at higher engine speeds. Engine efficiency also drops as torque increases relative to islands 602, 622 even though friction accounts for a larger portion of useful engine work in this region. The drop in engine efficiency is due to the need to retard spark to address knock. Finally, engine efficiency drops as torque decreases relative to islands 602, 622 due to fixed overheads incurred in the operating of engine components such as oil pumps and water pumps. The pumping work and friction losses (e.g., due to mechanical friction) increase relative to the amount of work done, reducing efficiency.

In addition, as the engine CR increases, the size and position of the islands change. In particular, the island of best efficiency for a higher compression ratio (622) may move to a relatively higher engine speed and higher engine torque as compared to the island of best efficiency for a lower compression ratio (602). Also, the island of best efficiency for the lower compression ratio may encompass a smaller area spread uniformly over a range of engine speeds and torques (that is, essentially circular in shape) while the island of best efficiency for the higher compression ratio may encompass a larger area spread over a wider range of engine speeds as compared to the range of engine torques (that is, essentially horizontally oval in shape).

At 306, the method includes determining if the fuel efficiency of the engine improves by more than a threshold amount by changing the compression ratio from the current compression ratio the engine is in to another compression ratio. For example, the engine may be currently operating at a first, lower compression ratio and in response to a change in the driver demand, it may be determined if the fuel efficiency of the engine improves by more than a threshold amount by transitioning to a second, higher compression ratio. In another example, the engine may be currently operating at a second, higher compression ratio and in response to the change in the driver demand, it may be determined if the fuel efficiency of the engine improves by more than a threshold amount by transitioning to a first, lower compression ratio. As such, the controller may choose the compression ratio providing the lower BFSC as the more fuel efficient compression ratio. In one example, the controller may use the fuel island maps for each compression ratio to pre-determine a line of optimal efficiency (calibrated as a function), as elaborated with reference to the example of FIG. 4.

If the fuel efficiency of the engine does not improve by more than the threshold amount, then at 318, the method includes maintaining the current compression ratio of the engine. Herein, the VCR mechanism (and thereby the piston's TDC position) is maintained in its current position. In other words, in response to a lower than threshold improvement in fuel efficiency, the current CR is maintained. Optionally, CVT adjustments may be used to adjust the engine speed-load profile in the current CR to achieve additional fuel economy benefits. For example, if the current CR is a lower CR, the engine speed may be lowered while the engine load is raised to reduce friction losses at low loads while in the current CR and while maintaining a demanded power level of the engine.

If the fuel efficiency of the engine improves by more than the threshold amount (based on the fuel efficiency comparison at 304), then at 308, the method includes predicting the engine speed speed and load after the CR transition to the modified CR. In particular, to maintain the power output responsive to the driver demand, the change in CR may result in a different engine speed-load profile. For example, for a given driver demand, the engine may provide the same power output by operating with a lower engine speed and higher engine load at the lower compression ratio or with a higher engine speed and lower engine load at the higher compression ratio.

At 310, it may be determined if any engine operating limitations are expected at the predicted engine speed-load for the more fuel efficient compression ratio. These may include, for example, knock limitations, or frictional losses. For example, it may be determined if knock is likely to occur at the predicted engine speed-load.

If knock is not expected at the predicted engine speed-load, then at 312, the method includes transitioning the engine to the modified compression ratio with the higher fuel efficiency via adjustments to the VCR mechanism. Herein the controller may transition to the compression ratio providing the lower BFSC. This includes the controller sending a signal to a VCR actuator coupled a VCR mechanism that mechanically alters the piston TDC position within the cylinder. For example the signal to the VCR actuator may actuate the VCR mechanism to a position where the piston position within the cylinder corresponds to the selected compression ratio. In one example, the VCR mechanism is a piston position changing mechanism. In another example, the VCR mechanism is a cylinder head volume changing mechanism.

For example, the engine may be configured with a VCR mechanism that mechanically alters the compression ratio of the engine between a first, lower compression ratio and a second, higher compression ratio. When the lower CR is the more fuel efficient CR, the controller may transition to the engine to the lower CR (from the higher CR), the engine operating at the lower compression ratio including the controller sending a signal to the VCR actuator to move the VCR mechanism. For example, the compression ratio may be reduced by reducing the piston position within a cylinder via one of an elliptical crankshaft rotation and an eccentric coupled to a piston pin and a variable height piston crown and a variable length connecting rod and an unconventional cranktrain linkage. In another example, when the higher CR is the more fuel efficient CR, the controller may transition to the engine to the higher CR (from the lower CR), the engine operating at the higher compression ratio including the controller sending a signal to the VCR actuator to move the VCR mechanism. For example, the compression ratio may be increased by increasing the piston position within a cylinder via one of an elliptical crankshaft rotation and an eccentric coupled to a piston pin and a variable height piston crown and a variable length connecting rod and an unconventional cranktrain linkage.

The routine may then move to 320 wherein the controller adjusts the CVT to provide the engine speed-load profile that is optimal for the selected CR. For example, the CVT may be adjusted to a lower speed ratio responsive to a transition to the lower CR, thereby lowering the engine speed. As another example, the CVT may be adjusted to a higher speed ratio responsive to a transition to the higher CR, thereby raising the engine speed.

In addition to actuating the VCR mechanism and the CVT, the controller may also actuate one or more of the engine intake throttle, intake and/or exhaust cams, valve lift, boost pressure, and spark timing to deliver the optimal load (torque) for the selected compression ratio.

Returning to 310, if knock is expected at the predicted engine speed-load, then at 314, the method includes predicting a fuel penalty associated with a knock mitigating adjustment. For example, it may be determined if the engine speed-load profile can be modified (via adjustments to a speed ratio of the CVT) to reduce the knock. Adjusting to the adjusted/modified engine speed-load profile may include selecting a speed ratio of the CVT that matches the adjusted engine speed-load profile. This may include selecting a speed ratio that raises the engine speed while lowering the engine load while at the higher compression ratio to maintain the power output of the engine while reducing knock. In one example, the engine speed may be increased while the engine load is decreased as engine operation in the modified CR approaches the knock limit. As such, the inventors have recognized that the engine speed-load profile may be varied while maintaining the engine power output via adjustments to a speed ratio of the CVT. Then, the fuel efficiency of the engine in the new engine speed-load profile and the selected CR may be calculated (in the present example, the fuel efficiency at the higher speed and lower load of the higher CR). In one example, the controller may refer a map, such as the example map of FIG. 4 (elaborated below) to determine if the change in engine speed-load results in transition of the engine from a first line (or island) of best fuel efficiency to a second, different line (or island) of best fuel efficiency, the second line having a lower fuel efficiency as compared to the first line. Herein, a fuel penalty may be estimated based on a drop in the fuel efficiency (e.g., based on a difference between the fuel efficiency at the first line relative to the second line). With reference to the above-described example, a first fuel efficiency of the engine at the higher CR with the default lower engine speed and higher engine load may be compared to a second fuel efficiency of the engine at the higher CR with the CVT-adjusted higher engine speed and lower engine load. In an alternate example, an amount of spark retard required to mitigate the knock may be determined and the corresponding fuel penalty may be computed.

At 316, the predicted fuel penalty associated with knock (Knk_fuel penalty) may be compared to the fuel economy change associated with the transition to the selected CR (CR_fuel economy). In other words, a fuel economy associated with operating the engine at the current CR is compared to the fuel economy change associated with operating the engine at the modified CR with the modified engine speed-load profile. Herein, the engine may be operated at the current CR with either a default engine speed-load profile for the current CR or a modified speed-load profile modified based on engine limitations at the current CR (which may be the same as or different from the engine limitations at the modified CR). Thus, the modified speed-load profile at the current CR may be different from the modified speed-load profile at the modified CR. For example, the modified speed-load profile at the current CR may be adjusted for friction losses while the modified speed-load profile at the modified CR may be adjusted for knock limitations. However, a power level of the engine is maintained at each of engine operation in the current CR (with default or modified speed-load profile) and the engine operation in the modified CR with the modified/adjusted speed-load profile.

If the fuel penalty is lower than the fuel economy change due to CR, that is, the net result even with the change in engine speed-load profile and the CR transition is a fuel benefit, then the method moves to 312 to transition the engine to the compression ratio with the higher fuel efficiency via adjustments to the VCR mechanism. This includes the controller sending a signal to a VCR actuator coupled a VCR mechanism to move the VCR mechanism.

In addition, at 320, the controller may adjust the CVT to provide the engine speed-load profile that is optimal for the selected CR and for addressing the given knock limitations. For example, the engine may be transitioned to the higher CR while the CVT is adjusted to a speed ratio that raises the engine speed and lowers the engine load while maintaining the same engine powertrain output.

If the fuel penalty is higher than the fuel economy change due to CR, that is, the net result even with the change in engine speed-load profile and the CR transition is a fuel loss, then the method moves to 318 to maintain the engine in the current compression ratio. Thus, even though the other CR may be nominally more fuel efficient for the given driver demand, the controller may maintain the engine in the current CR in view of fuel inefficient limitations that may be experienced when operating at the other CR. Maintaining the current CR includes the controller sending a signal to the VCR actuator coupled the VCR mechanism to maintain the position of the VCR mechanism. In addition, at 320, the controller may adjust the CVT to provide the engine speed-load profile that is optimal for the selected CR. This may include maintaining a default engine speed-load profile for the current CR while maintaining the current CR. Alternatively, this may include adjusting the engine speed-load profile for the current CR via adjustments to the CVT speed ratio while maintaining the current CR.

It will be appreciated that while the above method discusses predicting knock limitations at the predicted engine speed-load at 310, and predicting a knock mitigating fuel penalty at 314, this is not meant to be limiting. In an alternate example, the controller may predict frictional losses at the predicted engine speed-load and then predict a friction mitigating fuel penalty. For example, when operating with a lower CR at lower loads, friction may be traded for knock constraints. Thus, it may be more fuel efficient to transition the engine to the lower CR while the CVT is adjusted to a speed ratio that lowers the engine speed and raises the engine load while maintaining the same engine power output.

In one example, as elaborated with reference to FIG. 4, the data from fuel island data maps for each compression ratio may be reduced to two best efficiency lines that the controller can more quickly interpolate between in real-time. Otherwise, the controller would have to run an optimization on each fuel map, and then try to further optimize a point in-between the two compression ratio states. In the present approach, the controller may for use fuel island maps for compression ratio to pre-determine a line of optimal efficiency. Then, for the current power demand, the controller may look up lines of optimal efficiency for a current operating power and evaluate the two curves to determine optimal efficiency. If the CR is variable (e.g., if the CR changes 40% from a first CR, CR1, to a second CR, CR2), the controller may interpolate linearly between the line of optimal efficiency for the first CR and the second CR. Although the line may not be exactly linear, the changes may be small enough that a linear approximation may be a reasonable real-time approximation.

Turning now to FIG. 4, an example map 400 is shown for comparing fuel efficiencies associated with different CRs for a given driver demanded power output, as well as for comparing fuel efficiencies associated with different engine speed-load profiles for a given CR. In one example, the map of FIG. 4 may be generated during engine calibration and stored in the engine controller's memory. The controller may then reference the map during engine operation to determine whether to maintain a current CR or transition to an alternate CR responsive to a change in driver demand.

Map 400 depicts a first line of best efficiency versus power at a higher compression ratio, herein also referred to as a higher CR optimum-efficiency load limit 404 (depicted as a solid line). Map 400 also depicts a second line of best efficiency versus power at a lower compression ratio, herein also referred to as a lower CR optimum-efficiency load limit 406 (depicted as a dashed line). The plots are shown with engine speed along the x-axis and engine load or torque along the y-axis. An example BSFC island (herein oval) of best fuel efficiency for the higher compression ratio is overlaid at dotted line 408, while a corresponding island for the lower compression ratio is overlaid at dotted line 409. It will be appreciated that islands 408 and 409 represent the innermost island of lowest fuel consumption and that fuel islands outer to this island are not shown herein for reasons of clarity. As such, the exact positions of the ovals of constant efficiency will change depending on current knock limits, which vary with fuel octane, temperature, humidity, and of course compression ratio. The maximum torque of the engine at a given engine speed is shown by curve 402. Lines of constant power output corresponding to 10 kW-50 kW are depicted at power lines 450-490, respectively.

A first CR and CVT adjustment is shown with reference to operating points 410-416. Based on a current driver demand, the engine may be at operating point 410 on the engine speed-load map. In particular, based on the engine load corresponding to a position on (or just below) higher CR optimum-efficiency load limit 404, and a power demand of 10 kW, the engine may be operating at operating point 410 with the higher compression ratio and with an engine speed/load along power line 450. The engine speed-load at the current CR may be selected based on BSFC island 408.

If there is an increase in driver demand to 20 kW (such as due to an operator pedal tip-in while the engine is in the higher compression ratio), the engine may transition to operate along power line 460 and determine whether to stay in the higher CR or transition to the lower CR based on changes in fuel efficiency. As a first option, the engine could be moved to operating point 412 along power line 460. Herein, the driver demand is provided while maintaining the current higher CR. As a second option, the engine could be moved to operating point 414 along power line 460 where the same power output is provided while transitioning to the lower CR. As such, for the given driver demand, a higher fuel efficiency is provided at the lower CR, due to the engine operating on an island of higher fuel efficiency at point 414. However, the controller may further determine that operating point 414 is associated with a limitation (e.g., a knock limitation) which can be addressed by moving, as a third option, to operating point 416 where engine load is increased and engine speed is decreased while staying on power line 460. The engine speed-load adjustment may be performed via adjustments to a speed ratio for the CVT. Moving to operating point 416 would result in a drop in fuel economy (that is, incur a fuel penalty) relative to staying at operating point 414. However, the fuel penalty associated with the transition from operating point 414 to operating point 416 is smaller than the fuel improvement associated with the transition from operating point 412 to operating point 414. Consequently, in response to the increase in driver demand, it is more fuel efficient to move from operating point 410 to 416 by transitioning to the lower compression ratio and decreasing the engine speed while lowering the engine load in the higher CR.

It will be appreciated that if the engine speed-load adjustment required to address the limitation moved the engine, as a fourth option, to operating point 418 (where the engine load is further increased and engine speed is further decreased while staying on power line 460), the move would incur a larger fuel penalty. In that case, the fuel penalty associated with the transition from operating point 414 to operating point 418 would be predicted to be larger than the fuel improvement associated with the transition from operating point 412 to operating point 414. Consequently, in response to the increase in driver demand, it would be more fuel efficient to move from operating point 410 to 414 by maintaining the higher compression ratio.

A second CR and CVT adjustment is shown with reference to operating points 420-424. Based on a current driver demand, the engine may be at operating point 420 on the engine speed-load map. In particular, based on the engine load corresponding to a position on (or just below) higher CR optimum-efficiency load limit 404, and a power demand of 40 kW, the engine may be operating at operating point 420 with the higher compression ratio (that is, with the VCR mechanism actuated to a position where the distance between the piston and the cylinder head is higher) and with an engine speed/load along power line 480. The engine speed-load at the current CR may be selected based on BSFC island 409.

If there is an increase in driver demand to 50 kW (such as due to an operator pedal tip-in while the engine is in the higher compression ratio), the engine may transition to operate along power line 490 and determine whether to stay in the higher CR or transition to the lower CR based on changes in fuel efficiency. As a first option, the engine could be moved to operating point 422 along power line 490. Herein, the driver demand is provided while maintaining the current higher CR. As a second option, the engine could be moved to operating point 424 along power line 490 where the same power output is provided while transitioning to the lower CR. As such, for the given driver demand, a higher fuel efficiency is provided at the higher CR, as determined based on a comparison of their BSFC islands. Consequently, in response to the increase in driver demand, it is more fuel efficient to move from operating point 420 to 424 by maintaining the higher compression ratio. Additionally, further fuel economy benefits can be achieved via CVT adjustments while staying in the higher CR. Specifically, a speed ratio of the CVT can be adjusted to move the engine to operating point 426 along power line 490 where the same power output is provided while maintaining the higher CR by decreasing the engine load while increasing the engine speed.

In this way, for a given driver demand, an engine controller may estimate a first fuel economy associated with maintaining a first compression ratio to a second fuel economy associated with transitioning to a second compression ratio while operating with a knock-adjusted engine speed-load profile. If the second fuel economy is higher than the first fuel economy, the controller may determine that is more fuel efficient to transition, and the controller may transition the engine to the second compression ratio via mechanical adjustments to a piston position (such as via the VCR mechanism). In addition, the controller may transition the engine to the knock-adjusted engine speed-load profile via adjustments to a speed ratio of the CVT. Herein, transitioning to the knock-adjusted engine speed-load profile includes transitioning from a default engine speed-load profile of the second compression ratio. In one example, the knock-adjusted engine speed-load profile includes a higher engine speed and a lower engine load as compared to the default engine speed-load profile for a given power level at the given compression ratio. In addition, an engine power output during engine operation at the first compression ratio is same as the engine power output during engine operation at the second compression ratio with the knock-adjusted engine speed-load profile. In comparison, if the second fuel economy is smaller than the first fuel economy, the controller may determine that is not fuel efficient to transition, and the controller may maintain the first compression ratio. Additionally or optionally, the controller may transition to a friction-adjusted engine speed-load profile via adjustments to the speed ratio of the CVT while in the first compression ratio if the friction-adjusted engine speed-load profile provides even more fuel economy benefits (than staying in the first compression ratio with the default engine speed-load profile). In one example, where the second compression ratio is higher than the first compression ratio, the knock-adjusted engine speed-load profile at the second compression ratio includes a higher than default engine speed and a lower than default engine load, while the friction-adjusted engine speed-load profile at the first compression ratio includes a lower than default engine speed and a higher than default engine load.

Now turning to FIG. 5, map 500 depicts example CVT and VCR adjustments that may be integrated to provide synergistic fuel economy benefits. Map 500 depicts changes to an engine speed at plot 502, changes to an engine load at plot 504, changes to an engine power output at plot 506, changes to an engine compression ratio (CR) at plot 508, and a knock sensor output at plot 510. It will be appreciated that as used herein, the engine power is determined as a product of engine speed and engine load (or torque). In addition, the engine speed-load adjustments are achieved via adjustments a speed ratio of a CVT coupled between the engine and an output shaft. In the present example, the CR is adjustable between a first and a second value, although in alternate examples, additional CRs may be possible and/or the CR may be adjustable to any CR between the first and second values.

Prior to t1, the engine may be operating to provide a power output that is delivered via the depicted engine speed-load profile and with the engine in the higher CR. At t1, in response to an increase in driver demand, the power output of the engine may be increased. Herein, the power output is increased by transitioning to the lower CR due to the higher CR being more fuel efficient than the higher CR. In addition, further fuel economy benefits are achieved by adjusting the engine speed-load profile in the lower CR via CVT adjustments so that the same engine power is provided using a higher than default engine speed and a lower than default engine load. The default engine speed and load (for the given CR) are depicted here as dashed lines. In particular, if the engine were maintained in the higher CR and operated with the default engine speed-load, the engine would have been knock limited, as indicated by predicted knock sensor output 512 (dashed segment) exceeding the knock threshold (Knk_Thr). Herein, by transitioning to the higher engine speed and lower engine load via CVT adjustments while transitioning to the lower CR via VCR adjustments, knock at higher loads is addressed while improving the overall engine fuel economy, and without compromising engine power output.

The engine may operate with the higher than default engine speed and lower than default engine load at the lower CR for a duration until t2. At t2, in response to a drop in driver demand, the engine may be maintained in the lower CR while resuming the default engine speed and default engine load due to the engine not being knock limited any more. This operation may be maintained until t3.

At t3, in response to a decrease in driver demand, the power output of the engine may be decreased. Herein, the power output is decreased by transitioning to the higher CR due to the higher CR being more fuel efficient than the lower CR. In addition, further fuel economy benefits are achieved by adjusting the engine speed-load profile in the higher CR via CVT adjustments so that the same engine power is provided using a lower than default engine speed and a higher than default engine load. The default engine speed and load (for the given CR) are depicted here as dashed lines. In particular, if the engine were transitioned to the lower CR and operated with the default engine speed-load, the engine could have been friction limited. Herein, by transitioning to the lower engine speed and higher engine load via CVT adjustments while transitioning to the higher CR via VCR adjustments, friction losses at lower loads are reduced, while improving the overall engine fuel economy, and without compromising engine power output.

In this way, fuel efficiency of an engine can be improved by integrating VCR technology with CVT technology. By leveraging the different engine speed-load combinations achievable for a given engine power output via CVT adjustments, an engine controller can more accurately address engine limitations, such as knock limitations associated with a compression ratio transition. As such, this allows the fuel costs associated with a compression ratio transition to be more accurately determined, reducing the frequency of fuel inefficient compression ratio switches responsive to frequent changes in operator or wheel torque demand. Overall, fuel economy of an engine can be enhanced.

One example method for an engine coupled with a continuously variable transmission (CVT), comprises: for a power level, comparing engine efficiency at a current compression ratio to engine efficiency at a modified compression ratio with an adjusted engine speed-load; and in response to a higher than threshold improvement in the engine efficiency at the modified compression ratio with the adjusted engine speed-load, transitioning to the modified compression ratio and adjusting to the adjusted engine speed-load. In the preceding example, additionally or optionally, the method further comprises, in response a lower than threshold improvement in the engine efficiency, maintaining the current compression ratio. In any or all of the preceding examples, additionally or optionally, the method further comprises adjusting the engine speed-load while maintaining the current compression ratio, the adjusted engine speed-load with the current compression ratio different from the adjusted engine speed-load with the modified compression ratio. In any or all of the preceding examples, additionally or optionally, the adjusted engine speed-load with the modified compression ratio is based on a knock limit of the engine at the modified compression ratio. In any or all of the preceding examples, additionally or optionally, adjusting to the adjusted engine speed-load includes increasing the engine speed while decreasing the engine load to maintain the power level as engine operation at the modified compression ratio approaches the knock limit. In any or all of the preceding examples, additionally or optionally, adjusting to the adjusted engine speed-load includes selecting a CVT speed ratio matching the adjusted engine speed-load. In any or all of the preceding examples, additionally or optionally, the power level is maintained at each of engine operation in the current compression ratio and engine operation in the modified compression ratio with the adjusted engine speed-load. In any or all of the preceding examples, additionally or optionally, the power level is a powertrain output of the engine determined as a product of engine load and engine speed. In any or all of the preceding examples, additionally or optionally, transitioning to the modified compression ratio includes actuating a variable compression ratio mechanism to mechanically alter a piston position within a cylinder of the engine. In any or all of the preceding examples, additionally or optionally, the variable compression ratio mechanism is a piston position changing mechanism including one of an elliptical crankshaft and an eccentric coupled to a piston pin. In any or all of the preceding examples, additionally or optionally, the variable compression ratio mechanism is a cylinder head volume changing mechanism.

Another example method for an engine coupled with a continuously variable transmission (CVT), comprises: for a driver demand, estimating a first fuel economy associated with maintaining a first compression ratio to a second fuel economy associated with transitioning to a second compression ratio while operating with a knock-adjusted engine speed-load profile; and in response to the second fuel economy being higher than the first fuel economy, transitioning to the second compression ratio via mechanical adjustments to a piston position and transitioning to the knock-adjusted engine speed-load profile via adjustments to a speed ratio of the CVT. In the preceding example, additionally or optionally, transitioning to the knock-adjusted engine speed-load profile includes transitioning from a default engine speed-load profile of the second compression ratio. In any or all of the preceding examples, additionally or optionally, an engine power output during engine operation at the first compression ratio is same as the engine power output during engine operation at the second compression ratio with the knock-adjusted engine speed-load profile. In any or all of the preceding examples, additionally or optionally, the method further comprises, in response to the second fuel economy being smaller than the first fuel economy, maintaining the first compression ratio and optionally transitioning to a friction-adjusted engine speed-load profile via adjustments to the speed ratio of the CVT. In any or all of the preceding examples, additionally or optionally, the second compression ratio is higher than the first compression ratio, wherein the knock-adjusted engine speed-load profile includes a higher than default engine speed and a lower than default engine load, and wherein the friction-adjusted engine speed-load profile includes a lower than default engine speed and a higher than default engine load.

Another example vehicle system comprises: an engine with a cylinder; a VCR mechanism coupled to a piston of the cylinder for varying a compression ratio of the engine via mechanical alteration of a piston position within the cylinder; a continuously variable transmission (CVT) coupling the engine to vehicle wheels, the CVT having a plurality of speed ratios; and a controller. The controller may be configured with computer readable instructions stored on non-transitory memory for: estimating a first fuel economy associated with maintaining a first compression ratio to a second fuel economy associated with transitioning to a second compression ratio; if the second fuel economy is higher, predicting a fuel penalty associated with operating with a modified engine speed-load profile at the second compression ratio; and if the fuel penalty adjusted second fuel economy is higher than the first fuel economy, actuating the VCR mechanism to transition to the second compression ratio while selecting one of the plurality of speed ratios to provide the modified engine speed-load profile. In the preceding example, additionally or optionally, the controller includes further instructions for: if the first fuel economy is higher than the fuel penalty adjusted second fuel economy, maintaining a position of the VCR mechanism to maintain engine operation in the first compression ratio. In any or all of the preceding examples, additionally or optionally, the modified engine speed-load profile at the second compression ratio is a first modified engine speed-load profile based on an engine knock limit in the second compression ratio, wherein the controller includes further instructions for: while maintaining engine operation in the first compression ratio, predicting the fuel penalty associated with operating with a second modified engine speed-load profile at the first compression ratio, the second modified engine speed-load profile based on an engine friction loss in the first compression ratio; if the fuel penalty is smaller, operating with the second modified engine speed-load profile at the first compression ratio; and if the fuel penalty is larger, maintaining a default engine speed-load profile at the first compression ratio. In any or all of the preceding examples, additionally or optionally, the selecting includes selecting a first lower speed ratio when the modified engine speed-load profile includes a higher engine speed and a lower engine load, and selecting a second higher ratio when the modified engine speed-load profile includes a lower engine speed and a higher engine load.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine coupled with a continuously variable transmission (CVT), comprising:
   for a driver demand,
      estimating a first fuel economy associated with maintaining a first compression ratio to a second fuel economy associated with transitioning to a second compression ratio while operating with a knock-adjusted and friction-adjusted engine speed-load profile; and
      in response to the second fuel economy being higher than the first fuel economy, transitioning to the second compression ratio via mechanical adjustments to a piston position and transitioning to the knock-adjusted and friction-adjusted engine speed-load profile via adjustments to a speed ratio of the CVT.

2. The method of claim 1, wherein transitioning to the knock-adjusted and friction-adjusted engine speed-load profile includes transitioning from a default engine speed-load profile of the first compression ratio, and wherein an engine power output during engine operation at the first compression ratio is the same as the engine power output during engine operation at the second compression ratio with the knock-adjusted and friction-adjusted engine speed-load profile.

3. The method of claim 1, further comprising, in response to the second fuel economy being smaller than the first fuel economy, maintaining the first compression ratio and transitioning to the knock-adjusted and friction-adjusted engine speed-load profile via adjustments to the speed ratio of the CVT.

4. The method of claim 3, wherein the second compression ratio is higher than the first compression ratio, and wherein the knock-adjusted and friction-adjusted engine speed-load profile includes a higher than default engine speed and a lower than default engine load.

5. The method of claim 4, wherein the second compression ratio is lower than the first compression ratio, and wherein the knock-adjusted and friction-adjusted engine speed-load profile includes a lower than default engine speed and a higher than default engine load.

6. A vehicle system, comprising:
an engine with a cylinder;
a VCR mechanism coupled to a piston of the cylinder for varying a compression ratio of the engine via mechanical alteration of a piston position within the cylinder;
a continuously variable transmission (CVT) coupling the engine to vehicle wheels, the CVT having a plurality of speed ratios; and
a controller with computer readable instructions stored in non-transitory memory for:
estimating a first fuel economy associated with maintaining a first compression ratio to a second fuel economy associated with transitioning to a second compression ratio;
if the second fuel economy is higher, predicting a fuel penalty adjusted second fuel economy associated with operating with a modified engine speed-load profile at the second compression ratio; and
if the fuel penalty adjusted second fuel economy is higher than the first fuel economy, actuating the VCR mechanism to transition to the second compression ratio while selecting one of the plurality of speed ratios to provide the modified engine speed-load profile.

7. The system of claim 6, wherein the controller includes further instructions for:
if the first fuel economy is higher than the fuel penalty adjusted second fuel economy, maintaining a position of the VCR mechanism to maintain engine operation in the first compression ratio.

8. The system of claim 6, wherein the modified engine speed-load profile at the second compression ratio is a first modified engine speed-load profile based on an engine knock limit and engine friction in the second compression ratio, wherein the controller includes further instructions for:
while maintaining engine operation in the first compression ratio, predicting a fuel penalty associated with operating with a second modified engine speed-load profile at the first compression ratio, the second modified engine speed-load profile based on an engine knock limit and engine friction in the first compression ratio;
if the fuel penalty is smaller, operating with the second modified engine speed-load profile at the second compression ratio; and
if the fuel penalty is larger, maintaining a default engine speed-load profile at the first compression ratio.

9. The system of claim 6, wherein the selecting includes selecting a first lower speed ratio when the modified engine speed-load profile includes a higher engine speed and a lower engine load, and selecting a second higher ratio when the modified engine speed-load profile includes a lower engine speed and a higher engine load.

* * * * *